United States Patent
Lin et al.

(10) Patent No.: US 7,526,672 B2
(45) Date of Patent: Apr. 28, 2009

(54) MUTUAL EXCLUSION TECHNIQUES IN A DYNAMIC PEER-TO-PEER ENVIRONMENT

(75) Inventors: Shiding Lin, Beijing (CN); Qiao Lian, Beijing (CN); Zheng Zhang, Beijing (CN)

(73) Assignee: Microsoft Corporation, Redmond, WA (US)

( * ) Notice: Subject to any disclaimer, the term of this patent is extended or adjusted under 35 U.S.C. 154(b) by 503 days.

(21) Appl. No.: 10/886,794

(22) Filed: Jul. 8, 2004

(65) Prior Publication Data

US 2005/0188085 A1 Aug. 25, 2005

Related U.S. Application Data

(60) Provisional application No. 60/547,457, filed on Feb. 25, 2004.

(51) Int. Cl.
*G06F 11/00* (2006.01)
(52) U.S. Cl. .................. 714/6; 714/4; 709/225; 709/229
(58) Field of Classification Search .......... 714/4, 714/6; 709/229, 225, 226; 707/200–204
See application file for complete search history.

(56) References Cited

U.S. PATENT DOCUMENTS 5,553,298 A * 9/1996 Merryman et al. .......... 718/104
6,178,441 B1 * 1/2001 Elnozahy ................... 709/203
6,928,577 B2 * 8/2005 Moser et al. ................ 714/4
7,133,891 B1 * 11/2006 Uceda-Sosa et al. ........ 709/203
7,155,524 B1 * 12/2006 Reiter et al. ................ 709/229
2004/0078618 A1 * 4/2004 Moser et al. ................ 714/3

FOREIGN PATENT DOCUMENTS

WO WO2004012061 2/2004

OTHER PUBLICATIONS

Lin et al. "A Practical Distributed Mutual Exclusion Protoxol in Dynamic Peer-to-Peer Systems." IPTPS'04, Feb. 2004.*
Naor, et al.; "Scalable and Dynamic Quorum Systems", pp. 1-20.
"Freenet: A Distributed Anonymous Information Storage and Retrieval System", Clarke et al., Proc. Int. Workshop on Design Issues in Anonymity and Unobservability, Springer Verlag, LNCS 2009, 2001.
"A Scalable Content-Addressable Network", Ratnasamy et al, Proc. ACM SIGCOMM'01, San Diego, California, USA, 2001.

(Continued)

*Primary Examiner*—Robert Beausoliel
*Assistant Examiner*—Philip Guyton
(74) *Attorney, Agent, or Firm*—Lee & Hayes, PLLC

(57) ABSTRACT

Mutual exclusion techniques for use in a dynamic peer-to-peer environment are described. In an implementation, a method includes receiving, at each of a plurality of logical replicas, a request from a client. Each of the logical replicas includes a queue and is for exclusive association with one of the clients. The request is for accessing one of a plurality of resources. When a particular one of the logical replicas is exclusively associated with another one of the clients, the request is stored in the queue of the particular logical replica.

38 Claims, 7 Drawing Sheets

OTHER PUBLICATIONS

"Pastry: Scalable, Decentralized Object Location and Routing for Large-Scale Peer-to-Peer Systems", Rowstron et al, IFIP/ACM Int. Conf. Distributed Systems Platforms (Middleware), 2001.

"Chord: A Scalable Peer-to-peer Lookup Service for Internet Applications", Stoica et al, Proc. ACM SIGCOMM'01. San Diego, California, USA, 2001.

"Tapestry: An Infrastructure for Fault-tolerant Wide-Area Location and Routing", Zhao et al, Technical Report No. UCB/CSD-01-1141, Univ. of California, Berkeley.

Official Notice of Rejection for China Patent Application No. 200510064089.9 Mailed on Mar. 7, 2008. 14 Pgs.

* cited by examiner

US 7,526,672 B2

MUTUAL EXCLUSION TECHNIQUES IN A DYNAMIC PEER-TO-PEER ENVIRONMENT

RELATED APPLICATIONS

The present application claims priority under 35 U.S.C. §119(e) to U.S. Provisional Application No. 60/547,457, filed Feb. 25, 2004.

TECHNICAL FIELD

The present invention generally relates to peer-to-peer networks, and more particularly relates to mutual exclusion techniques in a dynamic peer-to-peer environment.

BACKGROUND

Peer-to-peer networks have recently attracted increased attention in both academia and business. Peer-to-peer networks offer many desirable features, such as adaptation, self-organization, load-balancing, fault-tolerance, low cost, high availability, scalability, and may be configured to provide a large pool of resources. Peer-to-peer networks have emerged as a popular way to share large amounts of data, such as by peers downloading songs that are referenced as being available for download through a peer-to-peer website.

When providing resources for use by multiple clients, situations may be encountered in which two or more clients desire access to a particular resource, which may be referred to as a "collision". Mutual exclusion techniques refer to techniques that may be used to share resources such that the different clients that desire access to the particular resource do not conflict and cause unwanted interactions. By using mutual exclusion techniques, clients may obtain "rights" to access the resource as specified by the particular mutual exclusion technique employed.

An example of a mutual exclusion technique involves the use of semaphores. Semaphores are values that each client can check and then change. Depending on the value that is found, the client can use the resource or will find that it is already in use and try again. Typically, a client using semaphores checks the value and then, if no other client is using the resource, changes the value to reflect that the resource is being used by the client such that subsequent clients will "know" that the particular resource is in use. Thus, semaphores provide a technique for coordinating and synchronizing activities in which multiple clients compete for the same resource, such as to share access to a particular file.

In the previous mutual exclusion techniques, however, problems caused by collisions between clients that desired use the particular resource were magnified by the "greedy" behavior of the clients. For example, a plurality of clients may desire access to a resource, with only one of the clients "winning" the rights to access the resource through use of a mutual exclusion technique. The "losing" client that did not obtain rights to access the resource, however, retried to gain rights by continually resending requests. The repeated resending of the requests consumed hardware and software resources of the peer providing the resource and the client trying to obtain access to the resource. Repeated resending also consumes network bandwidth between the client and the peer. This problem was further magnified as the numbers of clients that also desired access to the resource increased, thereby resulting in even greater inefficiencies.

Additionally, communication between a plurality of clients and the plurality of peers in a peer-to-peer network may encounter different communication latencies, one to another. For example, requests received from the plurality of clients for accessing a particular resource may reach different peers at different times due to variations in communication latency between the clients and the peers.

Accordingly, there is a continuing need for mutual exclusion techniques for use in a dynamic peer-to-peer environment.

SUMMARY

Mutual exclusion techniques for use in a dynamic peer-to-peer environment are described. In an example, a mutual exclusion technique utilizes queues to address variations in communication latency between clients and peers. The queues may be utilized by the peers to store the requests such that the peers may obtain a consistent view of when the requests were received, and therefore provide access to the resources based on the queues. In another example, use of queues reduces the "greedy" behavior of the clients by storing the requests in the queues such that the clients do not continually attempt to resend requests to access the resource.

In an implementation, a method includes receiving, at each of a plurality of logical replicas, a request from a client. Each of the logical replicas includes a queue and is for exclusive association with one of the clients. The request is for accessing one of a plurality of resources. When a particular one of the logical replicas is exclusively associated with another one of the clients, the request is stored in the queue of the particular logical replica.

In an additional implementation, a method includes forming a request by a client for communication to a plurality of logical replicas. The request is for one of a plurality of resources. The client receives a plurality of responses from the plurality of logical replicas and determines whether the client is permitted to utilize the one resource. The client waits for another plurality of responses without sending another request when another client is permitted to utilize the one resource.

In another implementation, a method includes forming, at each of a plurality of clients, a request for one of a plurality of resources for communication to a plurality of logical replicas. A plurality of responses is received at the plurality of clients from the plurality of logical replicas. Each of the clients determines, by using the plurality of responses, whether one of the plurality of clients is permitted to utilize the one resource. When none of the plurality of clients are permitted to utilize the one resource, a yield message is formed by at least one of the clients for communication to one or more of the plurality of logical replicas. The yield message is for causing each of the one or more logical replicas to form another response from a respective queue storing previous requests received from one or more of the clients.

In yet another implementation a peer-to-peer network includes logical replicas for permitting resource access using a quorum consensus protocol.

In still yet another implementation, a system includes a network, a plurality of clients, and a plurality of computing devices that are communicatively coupled to the network. The plurality of computing devices includes a plurality of logical replicas. Each of the logical replicas is configured to be exclusively associated with one of the plurality of clients at any one particular time. Each of the logical replicas also includes a queue for storing a request from one of the clients to access a resource when the logical replica is exclusively associated with another one of the clients.

BRIEF DESCRIPTION OF THE DRAWINGS

The same numbers are used throughout the disclosure and figures to reference like components and features.

DETAILED DESCRIPTION

Overview

Mutual exclusion techniques for use in a dynamic peer-to-peer environment are described. In an example, a mutual exclusion technique utilizes queues to address variations in communication latency between clients and peers. As previously stated, requests received from a plurality of clients for accessing a particular resource may reach different peers at different respective times due to variations in communication latency between the clients and the peers. Therefore, the peers may not have a consistent view of clients that are requesting access to the resources, such as when each of the clients requested such access. Queues may be utilized by the peers to store the requests such that the peers may obtain a consistent view of when the requests were received, and therefore provide access to the resources based on the queues.

Additionally, the queues reduce the "greedy" behavior of the clients. For example, the queues may be utilized to store requests from the clients such that the clients do not continually attempt to resend requests to access the resource. Thus, the clients may be thought of as in a state of "active waiting" for a response from the peers to the requests. An informed backoff mechanism may also be employed such that if a response to the request is not received after a specified period of time, the client may resend the request.

Exemplary Environment

Figure 1:
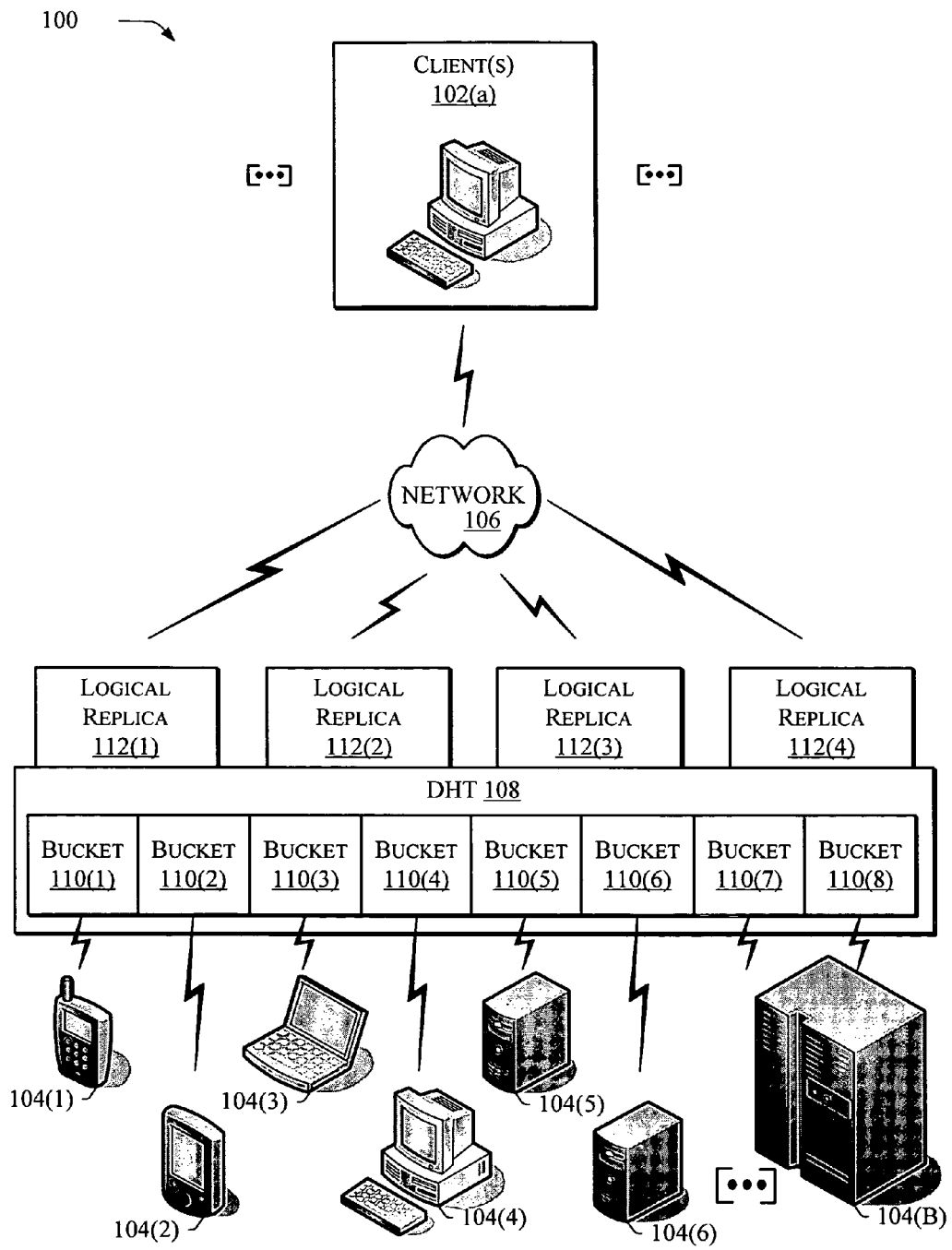
FIG. 1 is an illustration of an exemplary implementation showing an environment that is configured to provide a peer-to-peer network.

FIG. 1 is an illustration of an exemplary implementation showing an environment 100 that is configured to provide a peer-to-peer network. The environment 100 includes a plurality of clients 102(a), where "a" can be any integer from one to "A", that are communicatively coupled to a plurality of computing devices 104(1)-104(B) over a network 106. In this implementation, the plurality of clients 102(a) and the plurality of computing devices 104(1)-104(B) each represent a node in the network 106. A node may be thought of as a connection point to transmit data, such as a redistribution point that provides data to other nodes and/or an end point that is a destination and/or source of data.

The plurality of clients 102(a) and the plurality of computing devices 104(1)-104(B) may be configured in a variety of ways. For example, the clients 102(a) and computing devices 104(1)-104(B) may be configured as computers that are capable of communicating over the network 106, such as a wireless phone (e.g., computing device 104(1)), a tablet computer (e.g., computing device 104(2)), a notebook computer (e.g., computing device 104(3)), a desktop computer (e.g., computing device 104(4)), servers (e.g., computing devices 104(5)-104(6)), a mainframe computer (e.g., computing device 104(B)), and other computing devices, such as a mobile station, an entertainment appliance, a set-top box, and so forth. Further discussion of an exemplary computing device may be found in relation to FIG. 7. Thus, the plurality of clients 102(a) and computing devices 104(1)-104(B) may range from full resource devices with substantial memory and processor resources (e.g., personal computers, television recorders equipped with hard disk) to low-resource devices with limited memory and/or processing resources (e.g., traditional set-top boxes). The clients 102(a) may also relate to a person and/or entity that operate the client. In other words, client 102(a) may describe a logical client that includes a user and/or a machine.

The network 106 is configured as a peer-to-peer network. A peer-to-peer network allows nodes of the network 106 to access shared resources located on each of the nodes, i.e. the plurality of clients 102(a) and the plurality of computing devices 104(1)-104(B). Examples of peer-to-peer networks, which have been known and used in the past, include the following:

- Freenet, as described by I. Clarke, B. Wiley, O. Sanberg, and T. Hong in "Freenet: A Distributed Anonymous Information Storage and Retrieval System," *Proc. Int. Workshop on Design Issues in Anonymity and Unobservability*, Springer Verlag, LNCS 2009, 2001;
- Chord, as described by I. Stoica, R. Morris, D. Karger, M. F. Kaashoek, H. Balakrishnan in "Chord A Scalable Peer-to-peer Lookup Service for Internet Applications," *Proc. ACM SIGCOMM '01*, San Diego, Calif., USA, 2001;
- CAN, as described by S. Ratnasamy, P. Francis, M. Handley, R. Karp, and S. Shenker in "A Scalable Content-Addressable Network," *Proc. ACM SIGCOMM '01*, San Diego, Calif., USA, 2001;
- Pastry, as described by A. Rowstron and P. Druschel in "Pastry: Scalable, Decentralized Object Location and Routing for Large-Scale Peer-to-Peer Systems," *IFIP/ACM Int. Conf. Distributed Systems Platforms (Middleware)*, 2001; and
- Tapestry, as described by B. Y. Zhao, J. Kubiatowicz, and A. D. Joseph in "Tapestry: An Infrastructure for Fault-tolerant Wide-Area Location and Routing," *Technical Report No. UCB/CSD*-01-1141, Univ. of California, Berkeley.

Peer-to-peer networks may offer a variety of features, such as redundancy and fault tolerance. For instance, data stored in the peer-to-peer network may gradually spread as the data is replicated by nodes of the peer-to-peer network. Thus, data may become highly redundant in a peer-to-peer network, which may result in increased reliability and availability of the data.

A variety of resources may be exchanged using a peer-to-peer network, such as data, processing cycles, data storage, and so on. Thus, the peer-to-peer network may be utilized to leverage the collective power of the plurality of clients 102(a) and the plurality of computing devices 104(1)-104(B). Peer-to-peer is a communications model in which each peer, i.e. "member", may communicate directly with another member and/or through a mediating server.

The network 106 includes a distributed hash table (DHT) 108 which acts as an interface to route messages between the clients 102(a) and the plurality of computing devices 104(1)-104(B). The DHT 108 may be thought of as a distributed version of a hash table data structure that stores (key, value) pairs. For example, the key may correspond to a file name and the value may correspond to contents of the file. Each peer in the network 106, e.g. computing devices 104(1)-104(B), stores a subset of (key, value) pairs. The DHT 108 is therefore utilized to find a node responsible for a corresponding key. In other words, the DHT 108 maps the key to the node to route messages between the clients 102(a) and the plurality of computing devices 104(1)-104(B). A variety of services may be built "on-top" of the DHT 108, such as file sharing services, archival storage services (e.g., Web archiving), databases, naming systems, service discovery, application-layer multicast, event notification, chat services, rendezvous-based communication, query and indexing, data publishing/subscriptions, and so on.

The DHT 108 partitions resources provided by the plurality of computing devices 104(1)-104(B) into a plurality of buckets 110(1)-110(8). Each of the plurality of buckets 110(1)-110(8) may be thought of as a zone of the resources. For example, as previously described the DHT 108 associates resources with keys. The key is hashed to find a particular one of the plurality of buckets 110(1)-110(8) using the DHT 108. The plurality of buckets 110(1)-110(8) may be provided in a variety of ways. For example, bucket 110(1) is represented pictorially in FIG. 1 as being provided by computing device 104(1). Likewise, buckets 110(2), 110(3), 110(4), 110(5), 110(6) are each provided by respective computing devices 104(2), 104(3), 104(4), 104(5), 110(6). Additionally, a computing device may provide more than one bucket, which is represented pictorially in FIG. 1 as buckets 110(7), 110(8) as being provided by computing device 104(B).

The environment 110, when configured as a peer-to-peer network that employs the DHT 108, offers a virtual space populated by participating peers. The virtual space may be provided such that it does not have "holes", except during a transient period of time during membership change. For example, if computing device 104(6) becomes unavailable, such as due to hardware, software, and/or network error, the bucket 110(6) provided by the computing device 104(6) may be provided by another one of the computer devices, e.g. computing device 104(B). Thus, the network 106 is dynamic such that nodes may enter and leave the network without disrupting the network.

Because the DHT 108 may be used to form a logical space collectively from the plurality of computing devices 104(1)-104(B) that does not have holes, a set of logical replicas 112(1)-112(4) (replicas) may be implemented. For example, for a given resource R, its associated computing device CS(R) can be logical. For instance, there may be n replicas whose names are "/foo/bar:i" where i∈[1 ... n]. These names may be hashed to derive the keys, and the hosting node of each key may serve as a replica. The decoupling of naming and actual computing devices results in the provision of a "virtual computing device" which may be thought of as being "always" available, but may suffer from memory loss at random points in time. Moreover, as will be described in greater detail in relation to FIGS. 3 and 6, the introduction of multiple replicas implies that the latencies between a client and these replicas may be variable, thereby exerting an impact on performance.

Thus, the replicas 112(1)-112(4) are always available, e.g. "online", from the client's 102(a) perspective. As previously stated, however, any one of the replicas 112(1)-112(4) may encounter a complete memory loss from time to time. For example, a random reset may occur when one of the computing devices 104(1)-104(B) that provides a particular one of the replicas 112(1)-112(4) becomes unavailable and is replaced by another one of the computing devices 104(1)-104(B).

The replicas 112(1)-112(4) may also provide a mechanism for managing collisions between two or more of the plurality of clients 102(a) when the clients attempt to access the same resource. For example, the replicas 112(1)-112(4) may utilize a mutual exclusion technique the employs a quorum consensus protocol that is used to grant access to one of a plurality of clients that desire access to the same resource, which in portion of the following discussion will also be referred to as a "critical section" and in equations and drawings as "CS". Replicas 112(1)-112(4) may be thought of as processes that help the clients 102(a) to serialize access to a critical resource. Replicas may be identified by virtual names, which may be known to the entire environment 100. If a replica leaves the environment 100 (e.g., crashes), a "new" replica will replace the old one and assume the same virtual name. In practice, such virtual names can be implemented by a domain name server, by the DHT 108 in peer-to-peer systems, and so on. Because of such virtual naming mechanisms, the number of replicas in the system can be fixed through the lifetime of the system. Further discussion of execution of the mutual exclusion techniques may be found in relation to FIGS. 3-5.

Thus, the environment 100 may provide replicas 112(1)-112(4) that are viewed by the clients 102(a) as "always" available. The internal states of the logical replicas 112(1)-112(4), however, may be randomly reset. Additionally, the number of clients 102(a) in the environment 100 may be unpredictable and may be very large.

Figure 6:
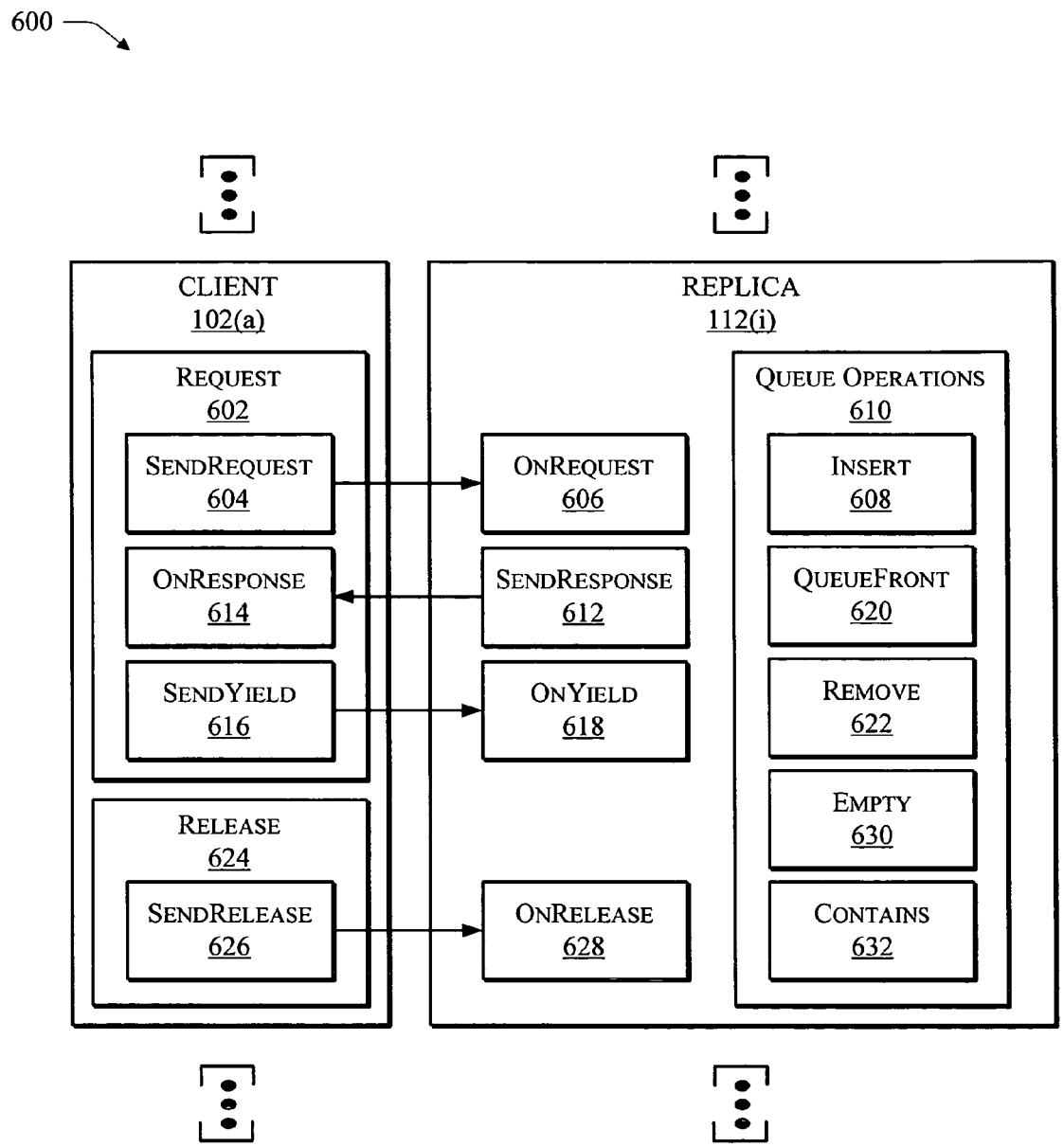
FIG. 6 is a block diagram illustrating an architecture of an implementation of a mutual exclusion protocol for execution by the client and the replica of FIG. 2 as described in relation to FIGS. 4 and 5.

The clients 102(a) and the replicas 112(1)-112(4) may communicate over the network 106 by using messages, such as requests and responses, further discussion of which may be found in relation to FIG. 6. In an implementation, the network 106 that communicatively couples the clients 102(a) and the replicas 112(1)-112(4) may be unreliable, i.e. messages could be replicated and/or lost. In the context of the following discussion, both clients 102(a) and replicas 112(1)-112(4) are peers in the DHT 108. In another implementation, however, only the replicas 112(1)-112(4) are recognized as peers in the DHT 108.

The replicas 112(1)-112(4) may be utilized to permit access to resources provided by the computing devices 114(1)-114(M) in a variety of ways. For example, each of the replicas 112(1)-112(4) may grant permission to access a particular resource on a "pseudo first-come/first-served" basis. Each replica 112(1)-112(4), for instance, may give permission to access the particular resource based on the order in which requests were received by the replicas 112(1)-112(4) from the clients 102(a). When a replica grants permission (or vote) to a client, the latter is called owner of the former. In other words, the replica is exclusively associated with that client such that it cannot be owned, while so owned, by another client. A client who has collected a majority of ownership of the replicas is said to be the winner of that execution of the mutual exclusion protocol and is thus permitted to access the resource. Further discussion of ownership and voting of replicas through use of responses may be found in relation to FIGS. 3 and 6.

Although seven computing devices 104(1)-104(B) are illustrated, a wide variety of computing devices may be implemented in the environment. Additionally, the plurality of clients 102(a) may also be configured as "peers" in the peer-to-peer network.

Mutual Exclusion

Mutual exclusion is one of the fundamental primitives to implement generic systems and applications on top of a network environment configured to employ a peer-to-peer DHT. Such a primitive may also provide a rudimentary service for utilization by applications that are executed on top of the peer-to-peer DHT to guard one or more of the arbitrary resources when necessary. For example, mutual exclusion may provide a concurrency control mechanism for a mutable distributed file system. To support changes in the environment 100 of FIG. 1, such as to add and/or remove nodes, such primitives are implemented inside the peer-to-peer DHT. Thus, implementation of the mutual exclusion protocol may be distributed.

The open and dynamic nature of peer-to-peer environment, e.g. the environment 100 of FIG. 1, brings a variety of challenges. For example, previous mutual exclusion protocols often assumed a closed system with a fixed and relatively moderate number of nodes. The nodes in this previous system communicated, one to another, in order to reach consensus. This solution, however, could not be employed in instances in which the number of clients was unpredictable and/or included a large number of clients. In the following discussion, a mutual exclusion technique is described that addresses the high variation of network latency between clients and replicas by employing a cooperative strategy to circumvent latency variance and contention, thus achieving scalability and robustness. Additionally, an informed backoff mechanism is described, which intelligently rebuilds replica's state, to handle a random reset of replicas.

Exemplary Protocol

A mutual exclusion protocol is described which may be utilized to resolve conflicting requests for a particular resource. For example, two or more of the plurality of clients 102(a) that want to utilize a critical section (CS), e.g. a particular resource, send requests to each of the replicas 112(1)-112(4) and wait for responses. Each of the replicas 112(1)-112(4) grants a lease if it is not owned by any other client. Otherwise, each of the replicas 112(1)-112(4) rejects the request but informs the requesting client (that is rejected) which of the clients 102(a) is the current owner. A quorum consensus technique may be employed such that the one client 102(a) that owns m out of n replicas, where m is a number of a quorum and n is the number of replicas, is the winner at this round and therefore is permitted to access the critical section (CS). The quorum may be determined in a variety of ways, such as m>n/2, and so on. Previously, clients that are not permitted to access the CS, i.e. "losers" of that round, release acquired votes (if any), backed-off and retried the request.

The replicas 112(1)-112(4), however, may suffer from random reset after which it forgets about its previous decision and is open to new request. The "change of heart" can cause the mutual exclusion to be broken. For instance, assuming that an average life of a node is T, and a probability that the node may crash in a period of t is t/T. The probability that any k out of m voted replicas resets may be shown as follows:

$$\binom{m}{k}\left(\frac{t}{T}\right)^k\left(1-\frac{t}{T}\right)^{m-k}$$

As shown by the above equation, safety will be broken when more than or equal to 2m-n resets occur during t, the probability of which may be represented as follows:

$$\sum_{k=2m-n}^{m}\binom{m}{k}\left(\frac{t}{T}\right)^k\left(1-\frac{t}{T}\right)^{m-k}$$

Thus, to tolerate up to k replica reset, n=3k+1 and m=2k+1 are desirable. Thus, as a design choice, the value of m may be raised.

Figure 2:
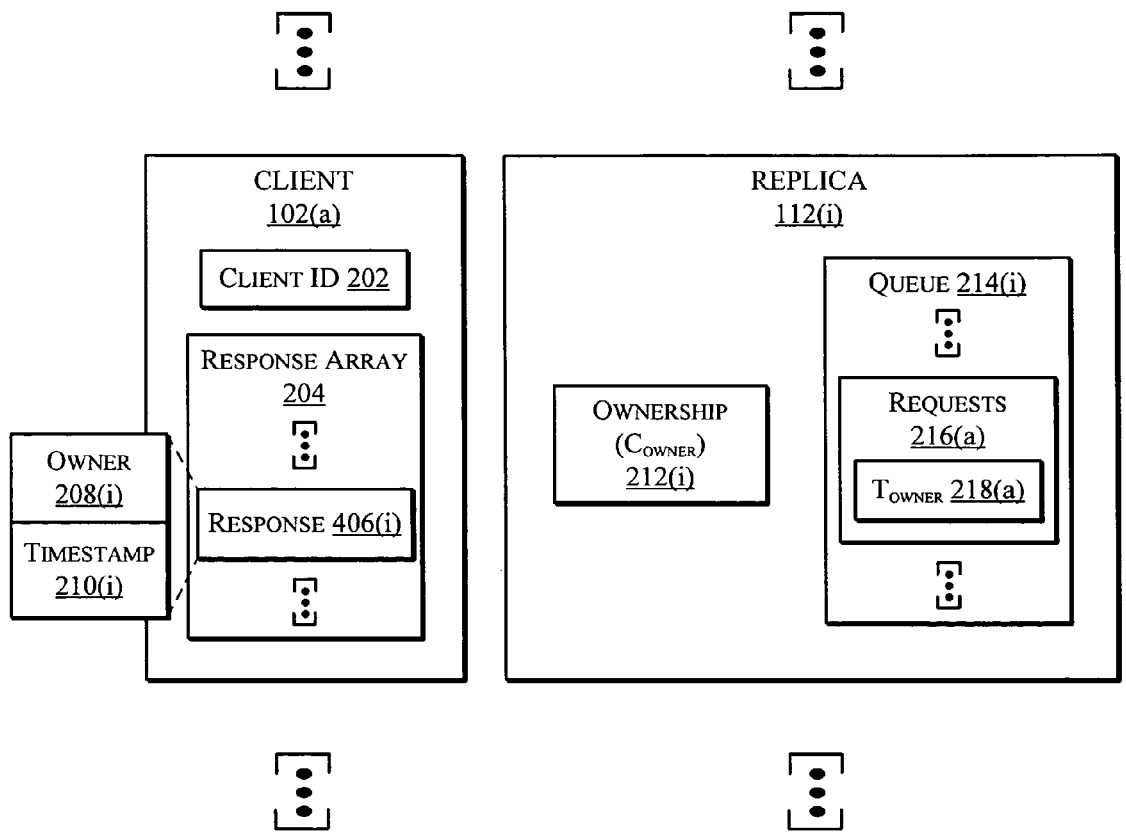
FIG. 2 is an illustration of an exemplary implementation of a system showing an architecture of a client and a replica of FIG. 1 in greater detail.

FIG. 2 is an illustration of an exemplary implementation of a system 200 showing an architecture of the client 102(a) of FIG. 1 and a replica 112(i), where "i" can be any integer from one to "I", in greater detail. The client 102(a) is illustrated as including a client ID 202 and a response array 204. The client ID 202 is for identifying the client 102(a) by the replica 112(1). The response array 204 is configured to store a plurality of responses 206(i) from the plurality of replicas 112(1)-112(4) of FIG. 1. For example, response 206(i) may be utilized to store a response obtained from an "i-th" replica, i.e. replica 112(i), and include data indicating the owner 208(i) of the corresponding replica and an associated timestamp 210(i) that indicates when the replica received a request for which the response 206(i) was formed.

The replica 112(i) maintains an ownership field 212(i) to indicate which of the plurality of clients 102(a), if any, owns the replica 112(i). The ownership field 212(i) may be represented as "$C_{owner}$" as shown in FIG. 2. A value of "nil" for the ownership field 212(i) indicates that the replica 112(i) has not voted for one of the clients 102(a). In other words, the replica 112(i) is not exclusively associated, currently, with a client A timestamp field 212(i) "$T_{owner}$" stores a timestamp of a request when received by the replica 112(i).

The replica 112(i) includes a queue 214(i) that stores requests 216(a) received from the plurality of clients 102(a). Each request 216(a) stored in the queue may correspond to one of the plurality of clients 102(a). The queue 214(a) may be configured to store the requests 216(a) in an order at which each of the requests 216(a) was received. For example, the queue 214(i) may utilize a clock, such as Lamport's logical clock, to generate a timestamp 218(a) for each of the requests 216(a). The queue 214(a) may then organize the requests 216(a) based on the respective timestamps 218(a). In another example, each request may be time-stamped by the client 102(a) itself. An example of the operation of the client 102(a) and the plurality of replicas 112(1)-112(4) of FIG. 1 may be found in the following implementation.

Exemplary Procedures

The following discussion describes mutual exclusion techniques that may be implemented utilizing the previously described architecture. Aspects of each procedure may be implemented in hardware, firmware, or software, or a combination thereof. The procedures are shown as a set of blocks that specify operations performed by one or more devices.

Figure 3:
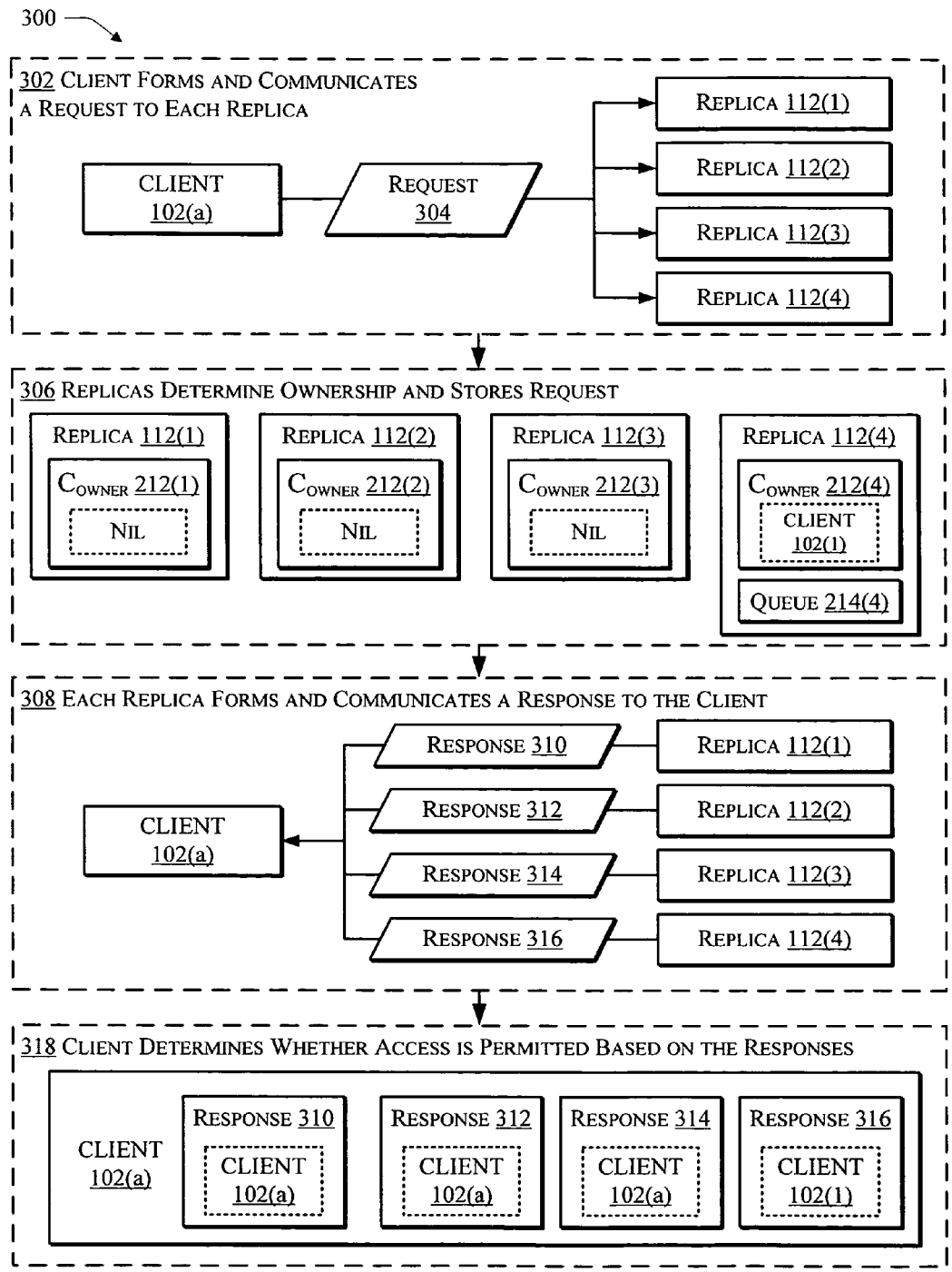
FIG. 3 is a flow diagram depicting a procedure in an exemplary implementation in which the client of FIG. 1 requests access to a resource provided by one or more of a plurality of peers in a peer-to-peer network.

FIG. 3 is a flow diagram depicting a procedure 300 in an exemplary implementation in which the client 102(a) of FIG. 1 requests access to a resource provided by one or more of a plurality of peers in a peer-to-peer network. At block 302, the client 102(a) forms and communicates a request 304 to each of a plurality of replicas 112(1)-112(4). The request 304 identifies a particular one of a plurality of resources that are provided in a peer-to-peer environment and contains the client ID 202 of FIG. 2 such that each of the plurality of replicas 112(1)-112(4) may differentiate the client 102(a) from another client.

At block 306, the replicas 112(1)-112(4) determine ownership. For example, each of the replicas 112(1)-112(4) may query the respective ownership fields 212(1)-212(4). The value in the ownership fields 212(1)-212(4) indicates which, if any, client owns the respective replica 112(1)-112(4). For example, the ownership field 212(1) of replica 112(1) is illustrated in phantom as having a "nil" value which indicates that the replica 112(1) is not currently owned by a client. Likewise, the ownership fields 212(2), 212(3) of respective replicas 112(2), 112(3) also are illustrated as having respective "nil" values. Therefore, replicas 112(1)-112(3) have not "voted" for ownership by a particular client.

The ownership field 212(4) of replica 112(4), however, is illustrated as including a value that indicates that the replica 112(4) is owned by client 102(1). Based on this determination of ownership, the replica 112(4) stores the request 304 in the queue 214(4) such that the client 102(a) does not need to resend the request, which is described in greater detail in relation to FIG. 5.

At block 308, each of the replicas 112(1)-112(4) forms and communicates a respective response 310-316 to the client 102(a). Each of the responses 310-316 includes an indication of ownership of the respective replica 112(1)-112(4). For example, each of the responses 310-316 may include a value from the ownership field ($C_{owner}$) from the respective replica 112(1)-112(4).

At block 310, the client 102(a) determines whether access to the resource is permitted based on the responses 310-316. For example, response 310 from replica 112(1) may include a result of the determination at block 306 that indicates that the replica 112(1) was not owned by another client. Therefore, the replica 112(1) is now owned by the client 102(a), which is illustrated at block 310 through inclusion of a phantom box and text describing the client 102(a) in the response 312. Likewise, responses 312, 314 from respective replicas 112 (2), 112(3) also include respective results of the determination at block 306. For example, both responses 312, 314 also indicate that the respective replicas 112(2), 112(3) were not owned by another client and therefore, both of the replicas 112(2), 112(3) are now owned by the client 102(a). Response 316, however, includes a result of the determination at block 306 which indicates that the corresponding replica 112(4) is owned by another client, e.g. client 102(1).

The client 102(a) may utilize a variety of mutual exclusion techniques to determine whether utilization of the resource is permitted based on the responses 310-316. For example, the client 102(a) may employ a quorum consensus protocol in which the client 102(a) is permitted to utilize the resource when the client 102(a) obtains ownership of "m" out of "n" replicas 112(1)-112(4) where m is a number of a quorum and n is the number of replicas. In other words, each of the replicas 112(1)-112(4) is configured to be exclusively associated with any one particular client at a time. This exclusive association may be utilized such that each replica "votes" for the client having the current exclusive association as indicated by the ownership field ($C_{owner}$) of the particular client.

The quorum may be determined in a variety of ways, such as m>n/2, and so on. Therefore, the client 102(a) may determine whether access is permitted to a particular resource based on ownership of the replicas 112(1)-112(4) as indicated by the respective responses 310-316 to the request 304. In the example illustrated at block 308, if m is set equal to three or less, the client 102(a) has a quorum of ownership of the replicas 112(1)-112(4) and therefore utilization of the resource is permitted. In another example, if m is set equal to four, the client 102(a) is not permitted to access the resource. Instead of immediately resending the request 304, however, the client 102(a) may wait to receive another response because the request was stored in the queue 212(4) at block 306. Therefore, if the client 102(a) does not win, the client is put in a state of "active waiting" for additional responses from the replicas 112(1)-112(4). Further discussion of queue usage and active waiting may be found in relation to FIGS. 4 and 5.

Thus, as shown in the exemplary procedure 600, the mutual exclusion technique may be configured such that the replicas 112(1)-112(4) do not communicate with each other to coordinate responses. For example, each replica may send its response to the client purely based on its own local state. This saves the time on the coordination between the replicas, and thus provides opportunities for clients to be granted access to their critical sections faster. The clients, therefore may be actively involved in the client selection process, rather than passively waiting for the decision from the replicas.

Figure 4:
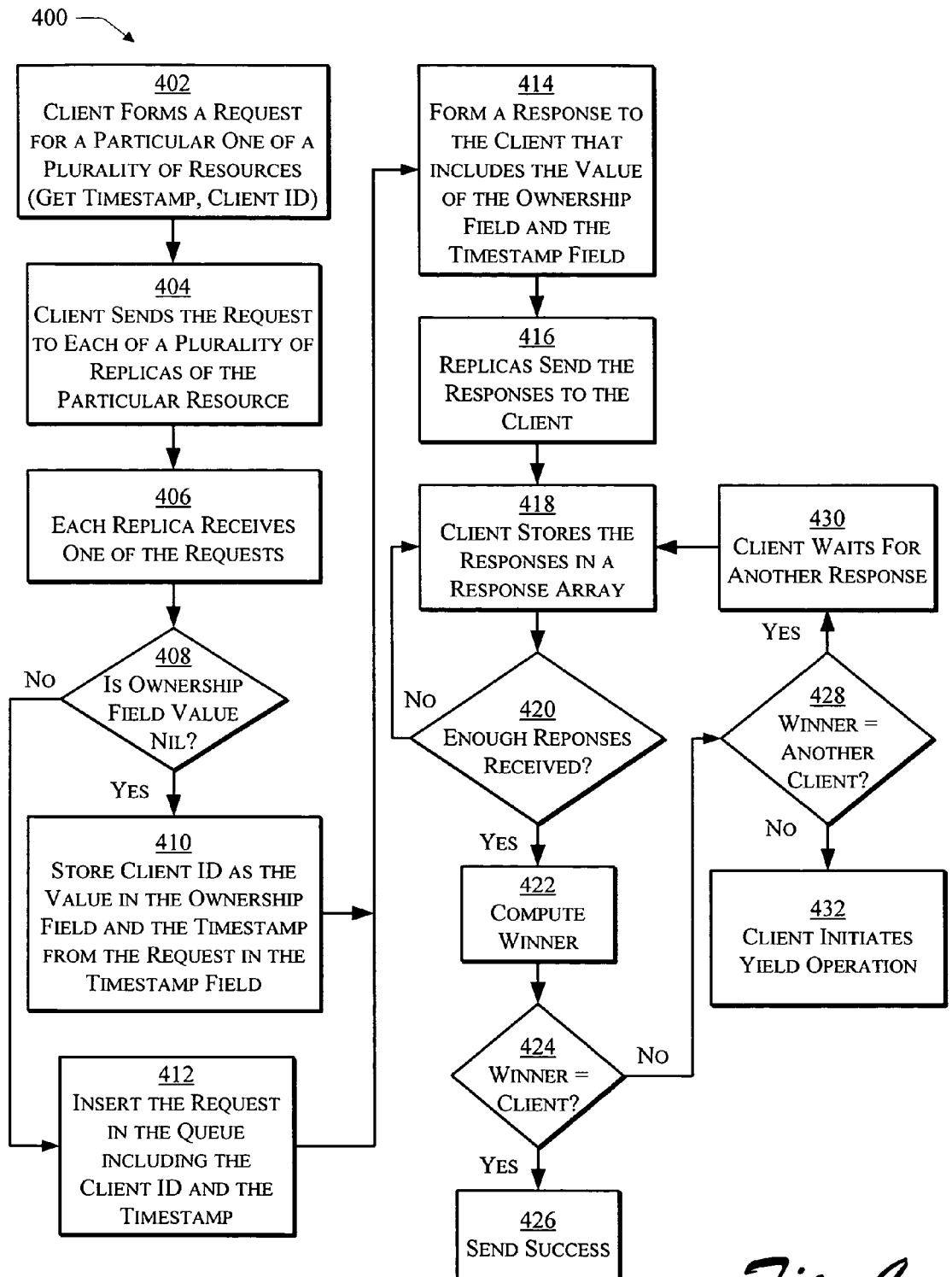
FIG. 4 is a flow diagram depicting a procedure in an exemplary implementation in which a client determines whether utilization of a particular one of a plurality of resources is permitted.

FIG. 4 is a flow diagram depicting a procedure 400 in an exemplary implementation in which a client determines whether utilization of a particular one of a plurality of resources is permitted. At block 402, the client forms a request to utilize a particular one of a plurality of resources. The request includes a timestamp obtained from a clock (e.g., Lamport's logical clock) and the client's ID (e.g., the client ID 202 of FIG. 2). At block 404, the client sends the request to each of a plurality of replicas associated with the particular resource such that each of the replicas receives one of the requests (block 406).

At decision block 408, each of the replicas determines whether a corresponding ownership field value has a "nil" value, i.e. the replica is not exclusively associated with a previous client. If ownership field value is nil, then at block 410 the client ID from the request is stored as the value in the ownership field (e.g., $C_{owner}$) of the replica. Additionally, the value of the timestamp in the request is stored in the timestamp field (e.g., $T_{owner}$) of the replica. If the ownership field value is not "nil" at block 408, then the request, including the client ID and the timestamp, is inserted into the queue of the respective replica. After performing the described actions of block 416 or block 412, the procedure 400 continues to block 414.

At block 414, a response is formed by each of the replicas that includes the respective values of the ownership and timestamp fields. At block 416, the replicas send the response to the client. For example, each of the replicas may communicate the responses over the network 106 of FIG. 1. At block 418, the client stores the response in a response array, such as the response array 204 of FIG. 2. At decision block 420, a determination is made as to whether enough responses have been received to compute a winner. This determination may be performed in a variety of ways. For example, the client may determine whether enough responses have been received to form a quorum, whether a response has been received from each of the replicas that received a request, and so on.

If enough responses have been received (block 420), then the client computes a winner (block 422). The winner may be computed in a variety of ways. For example, as previously described the client may determine whether the client has obtained ownership of a quorum of the replicas, such as m out of n replicas.

At decision block 424, a determination is made by the client as to whether the winner is the client. If the winner is the client (block 424), a success message is sent to the client (block 426) such that the client "knows" that access to the particular resource is permitted. If the winner is not the client (block 424), then the procedure 400 continues to decision block 428.

At decision block 428, a determination is made as to whether the winner is another client. If the winner is another client, the procedure continues to block 430. At block 430, the client waits for another response and the procedure 400 returns to block 418. In this way, the client is placed in a state of "active waiting" such that the client does not need to resend the request as was previously required, thereby conserving hardware and software resources of the client and computing device(s) providing the logical replica as well as network resources for communicating between the client and the computing device(s).

If the winner is not another client (block 428), then a winner could not be found in this "round". For example, if $j_{same}+n-j<m$, where j is the number of returned responses and the maximal number of same item in j is $j_{same}$, then none of the clients requesting access to the particular resource have "won" permission to access the resource. Therefore, at block 432, the client initiates a yield operation to send a yield message to each of the replicas that are owned by the client such that a winner may be found, an example of which is described in greater detail in the following implementation.

Figure 5:
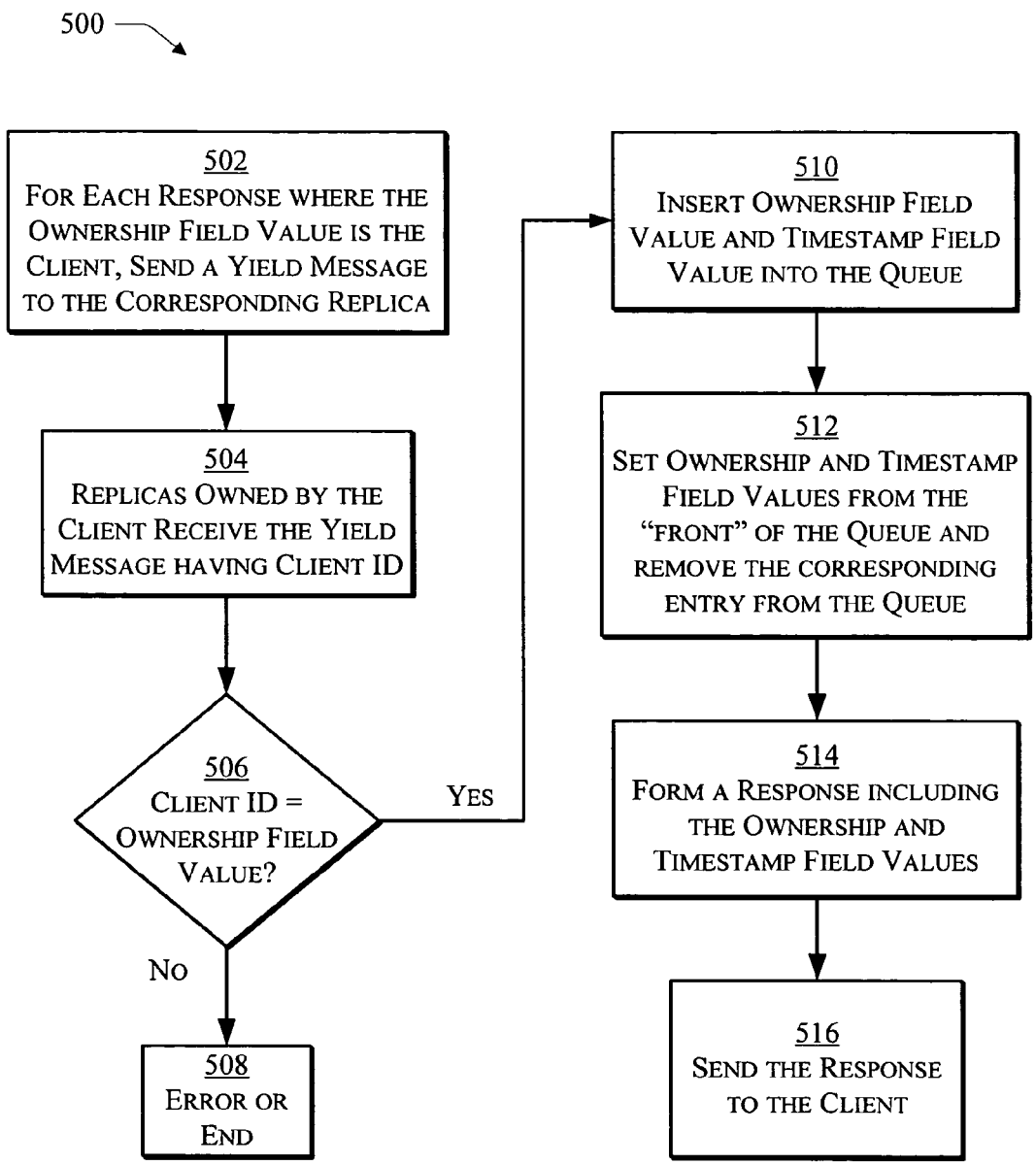
FIG. 5 is a flow chart depicting a procedure in an exemplary implementation showing execution of a yield operation of FIG. 4.

FIG. 5 is a flow chart depicting a procedure in an exemplary implementation 500 in which execution of the yield operation of FIG. 4 is shown. At block 502, for each response having an ownership field value that specifies the client, a yield message is sent to the corresponding replica that formed and communicated the response. For example, the client 102(a) at block 318 of FIG. 3 may send a yield message to replicas 112(1)-112(3) that sent the corresponding responses 310-314 that indicate that the client 102(a) owns (i.e., is exclusively associated with) the respective replicas 112(1)-112(3).

At block 504, the replicas that are owned by the client receive the yield message. The yield message includes the client ID to identify the client sending the yield message. At decision block 506, each of the replicas determines whether the client ID is equal to the value in the ownership field ($C_{owner}$) of the respective replica. In an implementation in which the yield message is only sent to replicas that are owned by the client, decision block 506 may serve to check for errors. For example, if the client ID does not match the value in the ownership field, an error is sent to the client (block 508). In another implementation, yield messages may be sent to all of the replicas, and therefore execution of decision block 506 may be utilized by each replica to determine whether the yield message is "relevant" to that replica.

If the client ID equals the value of the ownership field (block 506), then at block 510 the ownership field value and timestamp field value are inserted into the queue. For example, the ownership and timestamp field values may be copied to the queue. At block 512, the ownership and timestamp field values of the replica are then reset from the "front" of the queue and the corresponding entry used to set the values is removed from the queue. The queue, for instance, may organize entries in the queue according to the timestamps such that the oldest entries are placed in the "front" of the queue (e.g., is the first entry read), such as to provide a quasi "first-come/first-served" mechanism. Therefore, at blocks 510, 512, the values for the ownership and timestamp fields are reset using the least-recent, i.e. oldest, entries from the queue and the previous values of the ownership and timestamp fields are inserted into the queue.

At block 514, each of the replicas forms a response that includes the respective values of the ownership and timestamp fields. At block 516, the response is sent by the replica to the client. Thus, execution of the yield operation is collaborative in nature. The semantic of the yield operation may be thought of as "Release+Request" in that the replica is released for ownership by another client and the request is inserted into the queue. Further discussion of release and request operations may be found in relation to FIG. 6. Thus, when a replica receives a yield message, it removes the client from the winning seat, i.e. the value in the ownership field ($C_{owner}$), and inserts it into the queue. The replica then chooses the earliest client from the queue and notifies the winner.

The yield function results in a reshuffling of the queue. For example, because none of the clients "won" in FIG. 4 indicates that contention between clients has occurred. This, in turn, also implies that the queues are being built but that the winners may be out of place, such as due to network latency. By issuing the yield message, clients offer the replicas a chance to build a consistent view, one to another, and consequently choose a winner. The procedure 500 may be repeated multiple times until a winner is computed.

Exemplary Mutual Exclusion Protocol Architecture

FIG. 6 is a block diagram illustrating an architecture 600 of an implementation of a mutual exclusion protocol for execution by the client 102(a) and the replica 112(i) of FIG. 2 as described in relation to FIGS. 4 and 5. The architecture 600 depicts the exchange of messages between the client 102(a) and the replica 112(1) of FIG. 1 through the use of arrows. The architecture 400 may be described in terms of a message handler for the client 102(a) and the replica 112(i), respectively. Each of the exemplary operations will be discussed in conjunction with exemplary pseudo code for execution by the respective devices. Although one or more of the operations are shown separately and/or within other operations, the operations may be combined and rearranged in a variety of ways.

The client 102(a) and replica 112(i) may each support a variety of operations that provide mutual exclusion as previously described. The following discussion describes an exemplary order for execution of operations and exchange of messages such that communication between the client 102(a) and the replica 112(i) is illustrated in terms of message handler, which may be executed by the client or the replica 112(i).

The client 102(a) supports the following state variables, "id" which is the identifier of the client 102(a) (e.g., the client ID 202 of FIG. 2) and "resp[ ]" which is utilized to store the response from the replicas, such as the response array 204 of FIG. 2. The client 102(a) initiates a request 602 operation to form a request for each of the replicas that are utilized to control access to the resource, which may be performed through execution of the following pseudo code.

```
Request(CS) {
    timestamp := GetLogicalClock( ); //lamport's clock
    for each R[i] of CS
        SendRequest(R[i], id, timestamp);
}
```

The client 102(a) desires access to a particular one of a plurality of resources, which is represented in the pseudo code as "CS", i.e. critical section. R[i] is used to represent each of a plurality of replicas, e.g., replicas 112(i), that are utilized to permit access to the critical section. The "SendRequest" 604 operation, which is illustrated as a "sub-operation" of the request 602 operation, is executed to send the request to each replica "R[i]", and includes the client "id" and the timestamp from the clock.

The replica 112(i) supports the following state variables as previously described: $C_{owner}$, which is the owner of the client; and $T_{owner}$, which is the timestamp for the $C_{owner}$ value. A queue is used to store the requests. Upon receipt of the request from the client 102(a), the replica 112(i) executes the OnRequest 606 operation, exemplary pseudo code of which is represented as follows:

```
OnRequest(C, timestamp) {
    if(C_owner = nil) {
        C_owner := C;
        T_owner := timestamp;
    }
    else
        Queue.Insert(C, timestamp);
    SendResponse(C, Cowner, T_owner);
}
```

As shown in the pseudo code, the replica 112(i) receives a request that includes the client ID, represented as "C", and the timestamp of the request included from the client 102(a). The OnRequest 606 operation then determines if the replica ownership field $C_{owner}$ is empty, and if so, stores the client ID in the ownership field and the timestamp in the timestamp field $T_{owner}$. If the replica ownership field is not nil, the client ID "C" and the timestamp are inserted into the queue by executing the insert 608 operation of the queue operations 610. After the execution of the OnRequest and/or insert 606, 608 operations, the replica 112(i) executes the SendResponse 612 operation to send to the client 102(a) "C" the values of the ownership and timestamp fields ($C_{owner}$ and $T_{owner}$).

Upon receipt of one or more of the responses from the replicas 112(i), the client 102(a) initiates an OnResponse 614 operation, which may be represented as follows:

```
OnResponse(R[i], owner, timestamp) {
    resp[i].owner := owner;
    resp[i].timestamp := timestamp;
```

As shown in the pseudo code, the OnResponse 614 operation may store the response and the timestamp in the response at positions in respective arrays that correspond to the respective replica 112(i).

Execution of the OnResponse 614 operation then continues to compute a winner, as shown in the following pseudo code.

```
if (enough responses received) {
    winner := ComputeWinner( );
    if (winner = self)         // case 1
        return success;
```

As previously described in relation to FIG. 4 and shown in the pseude code, the client 102(a) may first compute whether that client 102(a) "won" permission to access the resource. If so, the client 102(a) is so informed. If not, execution of the OnResponse 614 operation continues as shown in the following.

```
    else if (winner = nil) {         // case 3
        for each resp[i].owner is self {
            SendYield(R[i], id);
            Clear(resp[i]);          // reset the state
        }
    }
    // case 2: some one else wins, then wait
}
```

As previously described in relation to FIGS. 4 and 5, if none of the clients win permission to access the particular resource, i.e. critical section (CS), the client 102(a) initiates the SendYield 616 operation to send a yield message to each of the replicas 112(i) that are owned by the client 102(a). The client 102(a) waits if another client wins. The client 102(a) then resets its state to receive additional responses.

The replica 112(i) executes an OnYield 618 operation in response to the yield message, which may be represented as follows:

```
OnYield(C) {
    if(C = C_owner) {
        Queue.Insert(C, T_owner);
        RespQueue( );
    }
}
RespQueue( ) {                       // helper routine
    <C_owner, T_owner> := Queue.Front( );
    SendResponse(C_owner, C_owner, T_owner);
    Queue.Remove(C_owner);
}
```

As shown in the pseudo code, if the replica 112(i) is owned by the client 102(a), the values from the ownership and timestamp files are inserted into the queue and a new winner is computed. The OnYield 618 operation may also initiate a RespQueue operation utilizing a collection of the queue operations 610. For example, a QueueFront 620 operation is first executed to determine the oldest entry in the queue, such as by examining timestamps of each of the entries. The SendResponse 612 operation is then executed to send another response that specifies the client selected from the queue from the QueueFront 620 operation. The remove 622 operation is then executed to remove the selected client from the queue for inclusion in the $C_{owner}$ and $T_{owner}$ fields of the replica 112(i).

The client also includes a release 624 operation, which may be represented utilized the following pseudo code:

```
Release(CS) {
    for all R[i] of CS
        SendRelease(R[i], id);
}
```

The release 624 operation is executed to relinquish ownership of the replica or to remove the corresponding request formed and sent by the client from the queue. For example, the replica, upon receipt of the release message, may execute an OnRelease 626 operation, which is represented as follows.

```
OnRelease(C) {
    if (C = C_owner) {
        C_owner := nil;
        if (not Queue.Empty( ))
            RespQueue( );
    }
    else if (Queue.Contains(C))
        Queue.Remove(C);
}
```

As shown in the pseudo code, if the replica 112(i) is owned by the client 102(a), the client 102(a) is removed from the $C_{owner}$ and $T_{owner}$ fields. Additionally, the QueueEmpty 630 operation is executed to determine whether the queue is empty. The QueueContains 632 operation is executed if the client 102(a) is not the current owner of the replica 112(i) to determine if the queue includes a request from the client 102(a), and if so, the QueueRemove 622 operation is executed to remove the request, e.g. the client ID and the timestamp, from the queue.

Replicas may also be configured to vote for a corresponding share of the available resources. For example, if all quorum members form a DHT, each member can vote with their share of space instead. Thus, a consensus is reached if the client has gathered f=m/n total fraction of the total space. Thus, a fixed number of replicas is not required, while retaining the same property to accommodate dynamic membership change.

Failure in the Environment

The mutual exclusion protocol previously described may also be utilized to address failure in the environment 100 of FIG. 1. For example, after crash, a replica might grant a vote (i.e., issue a new response) to a new client, despite the fact that it might have already done so to a previous client. Therefore, the m/n ratio may be raised to reduce the probability of breaking safety. In another example, each entry in the queue may be lost, which could result a clients waiting for responses that will not come. To address this example, the replica's memory may be rebuilt utilizing an informed backoff mechanism discussed in the following section. In a further example, a client that is currently utilizing the particular resource, i.e. the CS, crashes before exit, which may result in the replicas being "stuck". Therefore, the replica may grant permission to clients with renewable lease. When the lease expires, replica will grant permission to the next client (if any) in the queue. In yet another example, an unreliable communication channel between a client and a replica will cause similar problems as well.

Informed Backoff

Informed backoff is a mechanism which may be utilized to rebuild a restarted replica's state without overloading other replicas that were not restarted. Upon a request, the replica predicts an expected waiting time $T_w$ and communicates it to the client. The expected waiting time informs the client to wait that long before a next retry, i.e. resending the request. For example, an empirical calculation of $T_w$ is $T_w=T_{CS}*(P+1/2)$, where P is the client's position in the queue and $T_{CS}$ is the average CS duration, as observed by the replica, of an interval of time between any two consecutive release operations. The 1/2 in the formula is utilized to take the current owner of the replica into consideration. In an implementation, $T_w$ is updated upon each reception of a retry.

Use of the informed backoff mechanism may also be configured such that it does not interfere with "normal" operation of the client and replica. For example, suppose the replica has not crashed. If the client receives a response before the scheduled retry, minimal additional resources are utilized by the client. Additionally, if the client does retry, i.e. resend the request, the advised $T_w$ may not have been accurate. In such a case, the client may renew $T_w$ for retry. Therefore, if the replica does go through a reset, then the queue is reconstructed with the order similar to the original order.

Exemplary Computing Device

Figure 7:
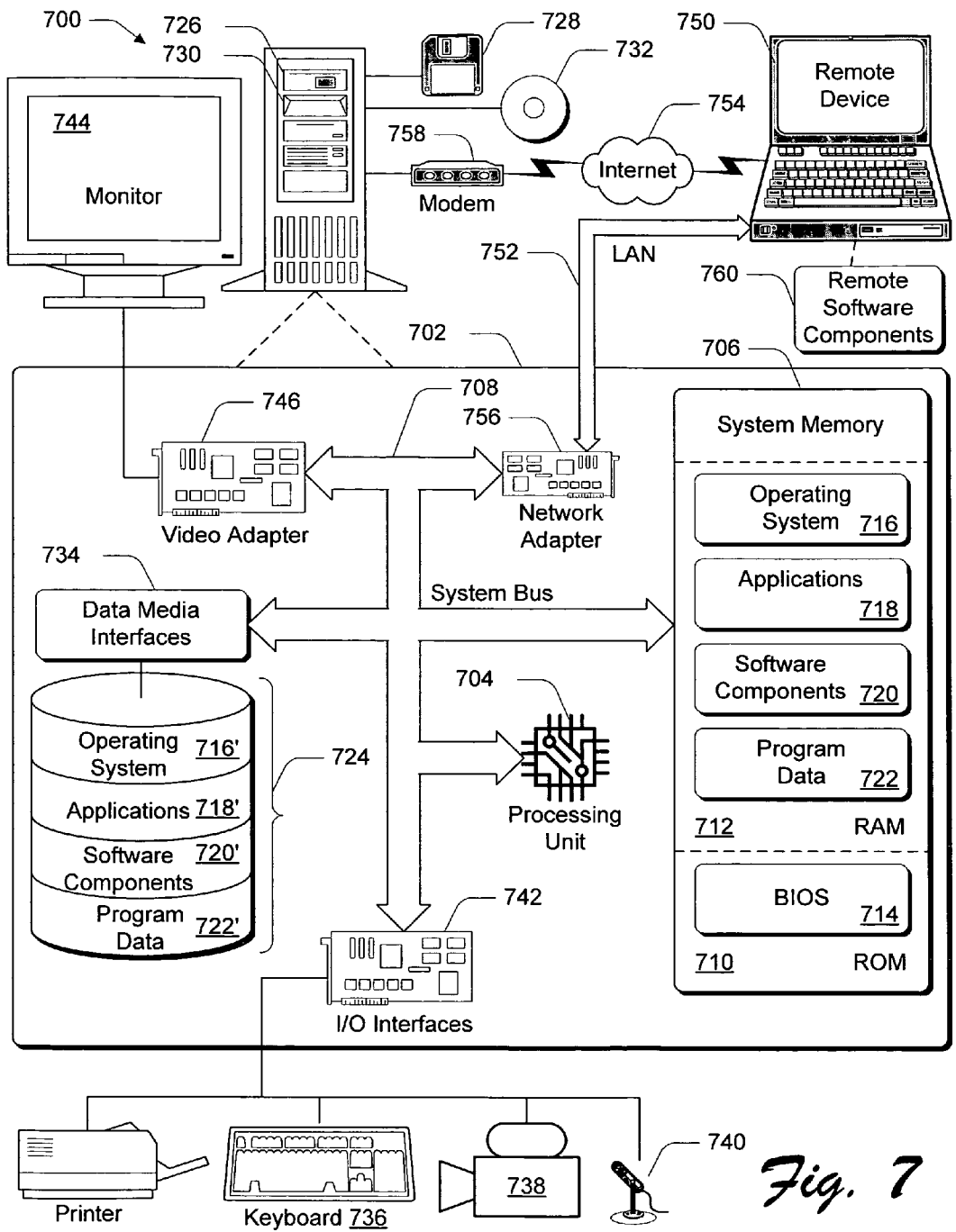
FIG. 7 is an illustration of an exemplary computing device.

The various components and functionality described herein are implemented with a number of individual computers. FIG. 7 shows components of a typical example of a computer environment 700, including a computer, referred by to reference numeral 702. The computer 702 may be the same as or different from the plurality of clients 102(a) and the plurality of computing devices 104(1)-104(B) of FIG. 1. The components shown in FIG. 7 are only examples, and are not intended to suggest any limitation as to the scope of the functionality of the invention; the invention is not necessarily dependent on the features shown in FIG. 7.

Generally, various different general purpose or special purpose computing system configurations can be used. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, network-ready devices, minicomputers, mainframe computers, distributed computing environments that include any of the above systems or devices, and the like.

The functionality of the computers is embodied in many cases by computer-executable instructions, such as software components, that are executed by the computers. Generally, software components include routines, programs, objects, components, data structures, and so on, that perform particular tasks or implement particular abstract data types. Tasks might also be performed by remote processing devices that are linked through a communications network. In a distributed computing environment, software components may be located in both local and remote computer storage media as previously described in relation to FIGS. 1 and 6.

The instructions and/or software components are stored at different times in the various computer-readable media that are either part of the computer or that can be read by the computer. Programs are typically distributed, for example, on floppy disks, CD-ROMs, DVD, or some form of communication media such as a modulated signal. From there, they are installed or loaded into the secondary memory of a computer. At execution, they are loaded at least partially into the computer's primary electronic memory.

For purposes of illustration, programs and other executable program components such as the operating system are illustrated herein as discrete blocks, although it is recognized that such programs and components reside at various times in different storage components of the computer, and are executed by the data processor(s) of the computer.

With reference to FIG. 7, the components of computer 702 may include, but are not limited to, a processing unit 704, a system memory 706, and a system bus 708 that couples various system components including the system memory to the processing unit 704. The system bus 708 may be any of several types of bus structures including a memory bus or memory controller, a peripheral bus, and a local bus using any of a variety of bus architectures.

Computer 702 typically includes a variety of computer-readable media. Computer-readable media can be any available media that can be accessed by computer 702 and includes both volatile and nonvolatile media, removable and non-removable media. By way of example, and not limitation, computer-readable media may comprise computer storage media and communication media. "Computer storage media" includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital video discs (DVD) or other optical disk storage, magnetic cassettes, magnetic tape, magnetic disk storage or other magnetic storage devices, or any other medium which can be used to store the desired information and which can be accessed by computer 702. Communication media typically embodies computer-readable instructions, data structures, program modules or other data in a modulated data signal such as a carrier wave or other transport mechanism and includes any information delivery media. The term "modulated data signal" means a signal that has one or more if its characteristics set or changed in such a manner as to encode information in the signal. By way of example, and not limitation, communication media includes wired media such as a wired network or direct-wired connection and wireless media such as acoustic, RF, infrared and other wireless media. Combinations of any of the above should also be included within the scope of computer readable media.

The system memory 706 includes computer storage media in the form of volatile and/or nonvolatile memory such as read only memory (ROM) 710 and random access memory (RAM) 712. A basic input/output system 714 (BIOS), containing the basic routines that help to transfer information between elements within computer 702, such as during start-up, is typically stored in ROM 710. RAM 712 typically contains data and/or software components that are immediately accessible to and/or presently being operated on by processing unit 704. By way of example, and not limitation, FIG. 7 illustrates operating system 716, applications 718, software components 720, and program data 722.

The computer 702 may also include other removable/non-removable, volatile/nonvolatile computer storage media. By way of example only, FIG. 7 illustrates a hard disk drive 724 that reads from or writes to non-removable, nonvolatile magnetic media, a magnetic disk drive 726 that reads from or writes to a removable, nonvolatile magnetic disk 728, and an optical disk drive 730 that reads from or writes to a removable, nonvolatile optical disk 732 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 724 is typically connected to the system bus 708 through a non-removable memory interface such as data media interface 734, and magnetic disk drive 726 and optical disk drive 730 are typically connected to the system bus 708 by a removable memory interface.

The drives and their associated computer storage media discussed above and illustrated in FIG. 7 provide storage of computer-readable instructions, data structures, software components, and other data for computer 702. In FIG. 7, for example, hard disk drive 724 is illustrated as storing operating system 716', applications 718', software components 720', and program data 722'. Note that these components can either be the same as or different from operating system 716, applications 718, software components 720, and program data 722. Operating system 716', applications 718', software components 720', and program data 722' are given different numbers here to illustrate that, at a minimum, they are different copies. A user may enter commands and information into the computer 702 through input devices such as a keyboard 736, and pointing device (not shown), commonly referred to as a mouse, trackball, or touch pad. Other input devices may include source devices (such as a microphone 738 or camera 740 which provide streaming data), joystick, game pad, satellite dish, scanner, or the like. These and other input devices are often connected to the processing unit 702 through an input/output (I/O) interface 742 that is coupled to the system bus, but may be connected by other interface and bus structures, such as a parallel port, game port, or a universal serial bus (USB). A monitor 744 or other type of display device is also connected to the system bus 708 via an interface, such as a video adapter 746. In addition to the monitor 744, computers may also include other rendering devices (e.g., speakers) and one or more printers, which may be connected through the I/O interface 742.

The computer may operate in a networked environment using logical connections to one or more remote computers, such as a remote device 750. The remote device 750 may be a personal computer, a network-ready device, a server, a router, a network PC, a peer device or other common network node, and typically includes many or all of the elements described above relative to computer 702. The logical connections depicted in FIG. 7 include a local area network (LAN) 752 and a wide area network (WAN) 754. Although the WAN 754 shown in FIG. 7 is the Internet, the WAN 754 may also include other networks. Such networking environments are commonplace in offices, enterprise-wide computer networks, intranets, and the like.

When used in a LAN networking environment, the computer 702 is connected to the LAN 752 through a network interface or adapter 756. When used in a WAN networking environment, the computer 702 typically includes a modem 758 or other means for establishing communications over the Internet 754. The modem 758, which may be internal or external, may be connected to the system bus 708 via the I/O interface 742, or other appropriate mechanism. In a networked environment, program modules depicted relative to the computer 702, or portions thereof, may be stored in the remote device 750. By way of example, and not limitation, FIG. 7 illustrates remote software components 760 as residing on remote device 750. It will be appreciated that the network connections shown are exemplary and other means of establishing a communications link between the computers may be used.

CONCLUSION

Mutual exclusion techniques have been described which may utilize logical replicas and quorum consensus to deal with system dynamisms in a peer-to-peer network. Quasi-consistency and cooperation between clients and replicas provided by the techniques described herein may be utilized to circumvent variances in network latency and contention. The mutual exclusion techniques also address failure, such as by utilizing informed backoff.

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A method comprising:
receiving, at each of a plurality of logical replicas, a request from a client, wherein:
the client is one of a plurality of clients;
each of the plurality of logical replicas is configured for exclusive association with any one of the plurality of clients at any particular time;
each said logical replica includes a queue; and
the request is for accessing one of a plurality of resources; and for each of the plurality of logical replicas:
in an event that, when the logical replica receives the request, the logical replica has an exclusive association with another one of the plurality of clients, storing the request in the queue of the logical replica; and
in an event that, when the logical replica receives the request, the logical replica does not have an exclusive association with another one of the plurality of clients, establishing for the logical replica, an exclusive association with the client.

2. The method as described in claim 1, further comprising forming, at each of the plurality of logical replicas, a response for communication to the client that identifies the exclusive association of the logical replica.

3. The method as described in claim 2, wherein each said response is for determining by the client whether the client is permitted to access the one said resource.

4. The method as described in claim 2, wherein
each said response is for determining by the client whether the client is permitted to access the one said resource; and
the client is permitted to access the one said resource when the client is exclusively associated with a quorum of the plurality of logical replicas.

5. The method as described in claim 2, wherein:
each said response is for determining by the client whether the client is permitted to access the one said resource; and
the client waits for another said response from each said logical replica when another one of the plurality of clients is permitted to access the one said resource.

6. The method as described in claim 2, wherein:
each said response is for determining whether one of the plurality of clients is permitted to access the one said resource; and
if none of the plurality of clients are permitted to access the one said resource, forming a yield message by client for:
communication to individual ones of the plurality of logical replicas; and
causing each of the individual ones of the plurality of logical replicas to form another said response.

7. The method as described in claim 6, wherein the other said response is formed from a previous said request stored in a respective said queue.

8. The method as described in claim 1, wherein:
the plurality of resources are partitioned using a Distributed Hash Table (DHT);
the DHT partitions each of the plurality of resources into a respective one of a plurality of buckets; and
the plurality of buckets are provided by a plurality of computing devices in a peer-to-peer network.

9. The method as described in claim 8, wherein the plurality of computing devices provide failover functionality such that when one said computing device that provides a respective said bucket is not available to the client, the respective said bucket is made available by another said computing device.

10. One or more computer storage comprising computer executable instructions that, when executed on a computer, direct the computer to perform the method as recited in claim 1.

11. A method comprising:
forming a request by a client for communication to a plurality of logical replicas, wherein:
the client is one of a plurality of clients; and
the request is for one of a plurality of resources;
receiving, at the client, a plurality of responses from the plurality of logical replicas, wherein each said response is configured to identify whether a respective said logical replica is owned by the client;
determining, from the plurality of responses, whether the client is permitted to utilize the one said resource; and
if it is determined that another one of the plurality of clients is permitted to utilize the one said resource, waiting, by the client, for another plurality of said responses without sending another said request.

12. The method as described in claim 11, wherein:
each said replica includes a queue; and
when none of the plurality of clients are permitted to utilize the one said resource, forming a yield message by at least one said client for:
communication to the plurality of logical replicas; and
causing the plurality of logical replicas to form another plurality of said responses from a respective said queue.

13. The method as described in claim 11, wherein the client is permitted to utilize the one said resource when exclusively associated with a quorum of the plurality of logical replicas.

14. The method as described in claim 11, wherein:
the plurality of resources are partitioned using a Distributed Hash Table (DHT);
the DHT partitions the plurality of resources into a plurality of buckets;
the plurality of buckets are provided by a plurality of computing devices in a peer-to-peer network; and
the plurality of computing devices provide failover functionality such that when one said computing device that provides a respective said bucket is not available to the plurality of clients, the respective said bucket is made available by another said computing device.

15. The method as described in claim 11, wherein:
each said logical replica includes a queue that stores one or more said requests; and
each said request in the queue is organized according to when the request was received by a respective said logical replica.

16. One or more computer storage media comprising computer executable instructions that, when executed on a computer, direct the computer to perform the method as recited in claim 11.

17. A method comprising:
forming, at each of a plurality of clients, a request for one of a plurality of resources for communication to a plurality of logical replicas;
receiving, at the plurality of clients, a plurality of responses from the plurality of logical replicas;
determining, at each said client using the plurality of responses, whether one of the plurality of clients is permitted to utilize the one said resource; and when none of the plurality of clients are permitted to utilize the one said resource, forming, by at least one said client, a yield message for:
    communication to one or more of the plurality of logical replicas; and
    causing each of the one or more said logical replicas to form another said response from a respective queue storing previous requests received from one or more said clients.

18. The method as described in claim 17, wherein:
    each said response is configured to identify whether a respective said logical replica is exclusively associated with one of the plurality of clients;
    each said previous request in the queue is organized according to when the previous request was received by a respective said logical replica; and
    the yield message causes the one or more said logical replicas to identify ownership in the other said response based on an earliest said previous request in a respective said queue.

19. The method as described in claim 18, wherein the yield message causes each said logical replica that is owned by the at least one said client to choose a different said client based on the respective said queue.

20. The method as described in claim 17, wherein the utilization of the one said resource is permitted when one of the plurality of clients is exclusively associated with a quorum of the plurality of logical replicas.

21. The method as described in claim 17, further comprising when one said client is permitted to access the resource, one or more other said clients that are not permitted waits for an additional plurality of said responses.

22. The method as described in claim 17, wherein:
    the plurality of resources are partitioned using a Distributed Hash Table (DHT);
    the DHT partitions the plurality of resources into a plurality of buckets;
    the plurality of buckets are provided by a plurality of computing devices in a peer-to-peer network; and
    the plurality of computing devices provide failover functionality such that when one said computing device that provides a respective said bucket is not available to the plurality of clients, the respective said bucket is made available by another said computing device.

23. One or more computer storage comprising computer executable instructions that, when executed on a computer, direct the computer to perform the method as recited in claim 17.

24. A peer-to-peer network of computing devices comprising logical replicas for permitting resource access using a quorum consensus protocol, wherein the quorum consensus protocol is used to permit resource access to a client that is exclusively associated with a quorum of the logical replicas.

25. The peer-to-peer network as described in claim 24, wherein each said logical replica is a peer that is executable by one or more of a plurality of computing devices.

26. The peer-to-peer network as described in claim 24, wherein each said logical replica includes a queue for storing requests received from one or more clients for resource access.

27. The peer-to-peer network as described in claim 26, wherein each said queue is for storing requests received from one said client when a respective said logical replica is exclusively associated with another said client.

28. The peer-to-peer network as described in claim 24, wherein the resource is one of a plurality of resources partitioned using a distributed hash table.

29. The peer-to-peer network as described in claim 24, wherein:
    each said logical replica employs an informed backoff mechanism that provides an expected waiting time to a client for receiving a response to a request for resource access; and
    the expected waiting time defines an amount of time the client is to wait before resending the request.

30. A system comprising:
    a network;
    a plurality of clients that are communicatively coupled to the network;
    a plurality of computing devices that are communicatively coupled to the network and include a plurality of logical replicas, wherein each said logical replica:
        is configured to be exclusively associated with any one of the plurality of clients at any one particular time; and
        includes a queue for storing a request from one said client to access a resource when the logical replica is exclusively associated with another said client at the time the request is received from the one said client,
    whereby, upon receipt, by a particular one of the logical replicas, of a request from a first client of the plurality of clients:
        in an event that the particular logical replica is exclusively associated with a second client of the plurality of clients, the request is stored in the queue of the particular logical replica; and
        in an event that the particular logical replica is not exclusively associated with any one of the plurality of clients, an exclusive association is established between the particular logical replica and the first client.

31. The system as described in claim 30, wherein each said logical replica is further configured to form a response to the request which identifies the other said client.

32. The system as described in claim 31, wherein each said client is configured to determine from each said response whether one of the plurality of clients is permitted to access the one said resource.

33. The system as described in claim 30, wherein:
    each said logical replica is further configured to form a response to the request which identifies when one said client owns the logical replica;
    each said client is configured to determine from each said response whether one of the plurality of clients is permitted to utilize the one said partitioned resource; and
    permission is obtained when one said client is exclusively associated with a quorum of the plurality of logical replicas.

34. The system as described in claim 30, wherein:
    each said logical replica is further configured to form a response to the request which identifies whether one said client is exclusively associated with the logical replica; and
    each said response is for determining by each said client whether the client is permitted to access the one said partitioned resource, and if not, the client waits for another said response.

35. The system as described in claim 30, wherein:
    each said logical replica is further configured to form a response to the request which identifies whether one said client is exclusively associated with the logical replica;
    each said response is for determining by the plurality of clients whether one said client is permitted to utilize the one said resource; and if none of the plurality of clients are permitted to utilize the one said resource, at least one said client forms a yield message for:
- communication to one or more of the plurality of logical replicas; and
- causing each of the one or more said logical replicas to form another said response from a respective said queue storing previous requests received from one or more said clients.

36. The system as described in claim 30, wherein:
a distributed hash table partitions the plurality of resources into a plurality of buckets;
the plurality of buckets are provided by the plurality of computing devices in a peer-to-peer network; and
the plurality of computing devices provide failover functionality such that when one said computing device that provides a respective said bucket is not available to the plurality of clients, the respective said bucket is made available by another said computing device.

37. The system as described in claim 30, wherein
each said logical replica employs an informed backoff mechanism that provides an expected waiting time for receiving a response; and
the expected waiting time defines an amount of time a respective said client is to wait before resending a respective said request.

38. A system comprising:
means for forming a plurality of requests for a resource, wherein the forming means includes a plurality of clients;
means for networking the forming means in a communicative coupling; and
means for providing the resource, wherein the providing means are communicatively coupled to the network means and include:
- a plurality of logical replica means for:
  - forming a response to each of the plurality of requests that identifies which of the forming means owns a respective said logical replica means; and
  - storing one or more said requests;
- a plurality of computing devices communicatively coupled to form a peer-to-peer network; and
- a distributed hash table.

* * * * *